United States Patent [19]
Home

[11] Patent Number: 5,638,808
[45] Date of Patent: Jun. 17, 1997

[54] OUTDOOR FULL FUNCTION COOKING APPLIANCE

[76] Inventor: William Home, 9th Fl/3, No. 374, Sec. 2, Pa-Teh Road, Taipei City, Taiwan

[21] Appl. No.: 534,244

[22] Filed: Sep. 26, 1995

[51] Int. Cl.$^6$ ..................................................... F24C 3/00
[52] U.S. Cl. .................. 126/41 R; 126/25 R; 126/39 K; 126/265; 99/401; 99/645
[58] Field of Search ................. 126/41 R, 25 R, 126/26, 25 A, 37 R, 42, 39 E, 39 N, 39 K, 265; 99/645, 401, 447

[56] References Cited

U.S. PATENT DOCUMENTS

| | | | |
|---|---|---|---|
| 4,553,524 | 11/1985 | Wheat et al. | 126/41 R X |
| 5,076,252 | 12/1991 | Schlosser et al. | 126/41 R X |
| 5,086,753 | 2/1992 | Berger | 126/41 R |
| 5,127,824 | 7/1992 | Barker | 126/41 R X |
| 5,186,159 | 2/1993 | Crow, Jr. et al. | 126/41 R |
| 5,413,087 | 5/1995 | Jean | 126/41 R |

FOREIGN PATENT DOCUMENTS 59362   2/1975   Australia ........................... 126/41 R

*Primary Examiner*—Larry Jones
*Attorney, Agent, or Firm*—Morton J. Rosenberg; David I. Klein

[57] ABSTRACT

A unique outdoor full function cooking appliance including a cart, a grill fixedly mounted on the cart and having a hemispherical body and a lid, two ring burners one disposed within the other, mounted within the hemispherical body, a flame tamer arranged within the hemispherical body and located above the two ring burners, a supporting mount fitted in a central portion of the flame tamer, a circular disc, and a cooking wire grid mounted with the hemispherical body and located above the supporting mount, whereby the cooking appliance combines the functions of barbecue gas grill, stove and oven in one unit thereby enabling it to be used with other cooking wares for making soup, sauce, frying dishes, and vegetable in addition to barbecuing.

6 Claims, 9 Drawing Sheets

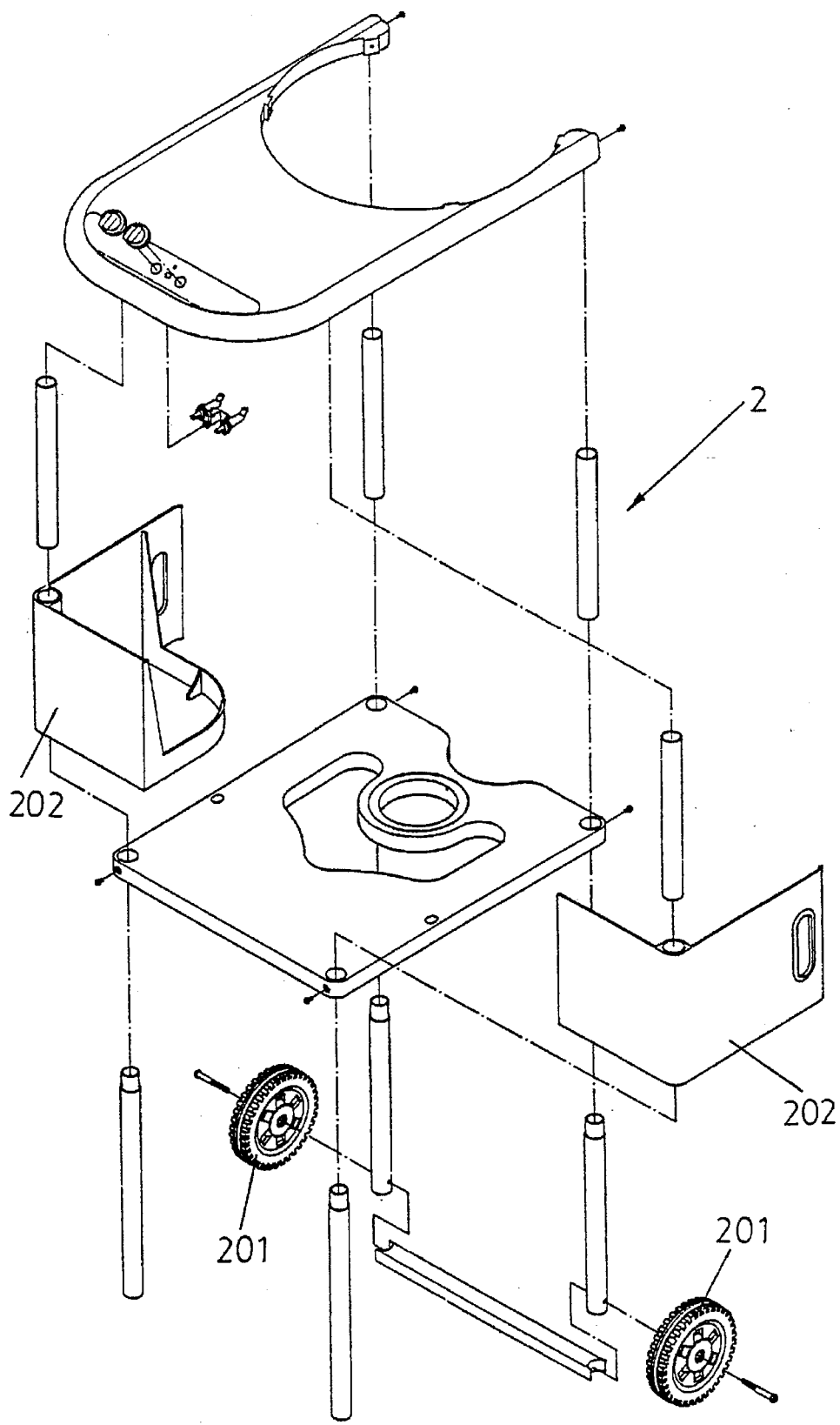
F I G. 5

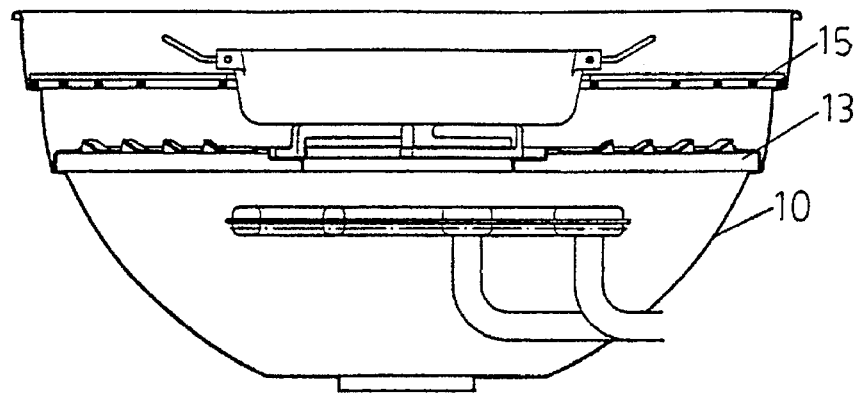
F I G. 6A
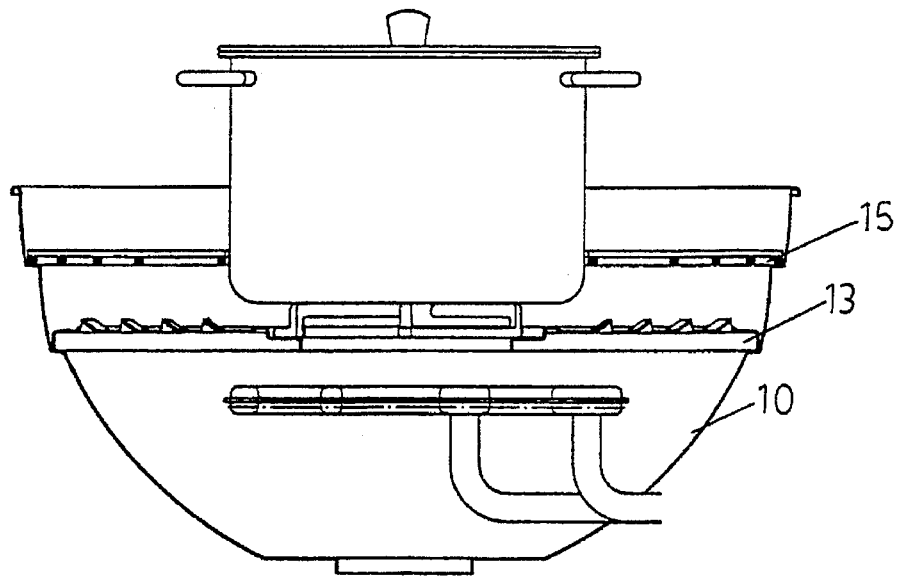
F I G. 6B
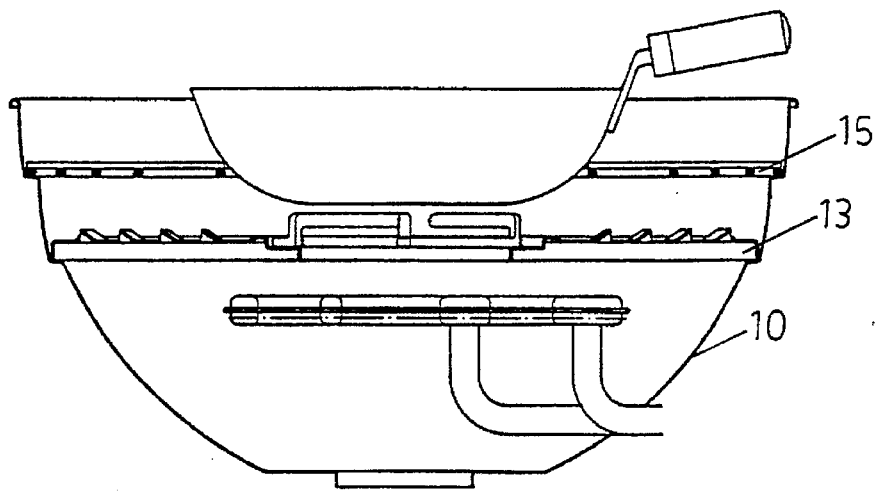
F I G. 6C

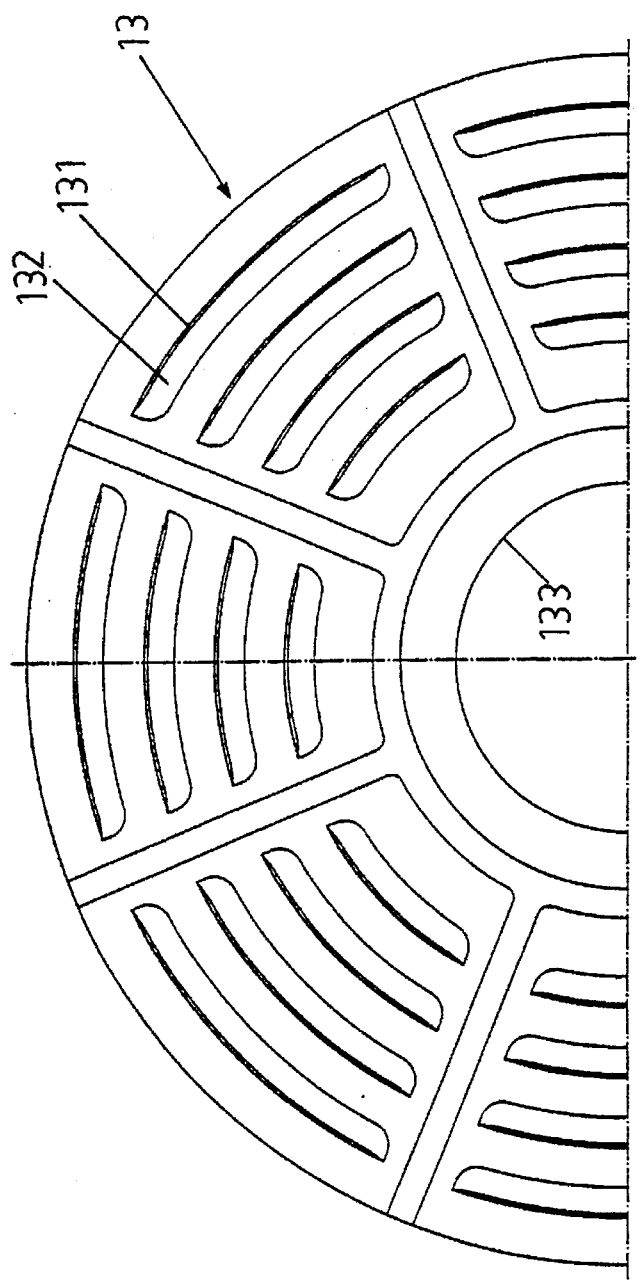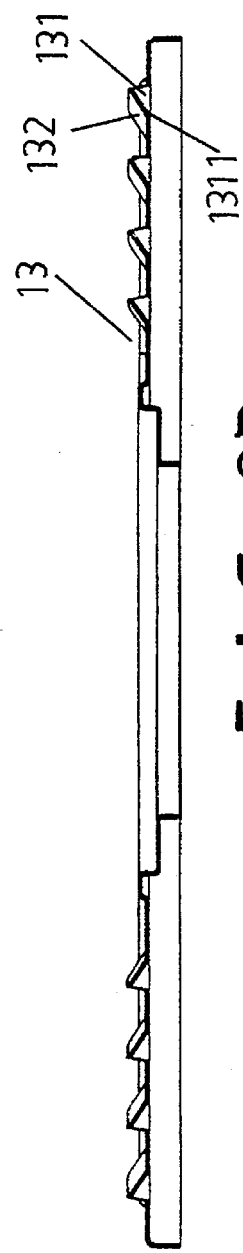
FIG. 9A
FIG. 9B

OUTDOOR FULL FUNCTION COOKING APPLIANCE

BACKGROUND OF THE INVENTION

1. Field of the Invention

This invention is related to a unique gas grill with complete cooking function for dishes of dinner at the same time.

2. Description of the Prior Art

It has been found that the conventional outdoor gas grill on the market is simply a unit with two burners one at the left while the other at the right, a rock wire with lava rock above the burners, and a cooking grid on the top. However, the gas grill is designed for barbecue use only and cannot be used with cooking wares such as cooking pan, cooking pot, Chinese wok or the like thereby making it impossible to prepare soup, pizza, Spanish dishes, cakes, casserole cooking, Chinese cuisine and so on. Hence, a gas grill provided with a side burner has been developed to meet this need. Nevertheless, the cooking ware on the side burner is easily tilted over, which might be very dangerous especially when kids are playing around. Further, the side burner cannot work in windy weather.

On the other hand, round-shaped charcoal kettles have been widely used in Chinese society for thousands of years and also have been popular in North America for years. In modern times, however, the use of charcoal for barbecuing is viewed as harmful to the environment not only because of smoke which produces when burnt, but also due to the trees which are cut down to make charcoal. As a result, round-shaped charcoal kettles are no longer suitable for use. Furthermore, there is a need for an ideal outdoor cooking appliance which combines the functions of barbecue gas grill, stove and oven in one unit. By using this appliance, one can avoid having to run in and out of the kitchen to prepare different kinds of dishes. Besides, the ideal outdoor cooking appliance will eliminate the heat produced by smoking or deep frying indoors.

Therefore, it is an object of the present invention to provide an outdoor full function cooking appliance which can obviate and mitigate the above-mentioned drawbacks. More precisely, the present invention provides an outdoor cooking appliance which combines the function of barbecue gas grill, stove and oven in one unit.

SUMMARY OF THE INVENTION

This invention relates to an outdoor full function cooking appliance.

It is the primary object of the present invention to provide an outdoor full function cooking appliance which can be used with other cooking wares for making soup, sauce, cooking vegetable and frying dishes in addition to barbecuing at the same time.

It is another object of the present invention to provide an outdoor full function cooking appliance having a revolutionary flame tamer which can eliminate flare-ups and provide even-heat distribution for the cooking grid.

It is still another object of the present invention to provide an outdoor full function cooking appliance having two eccentric burners which can provide even-heat distribution and operated simultaneously or separately.

It is still another object of the present invention to provide an outdoor full function cooking appliance which has two swing-out containers for storing cooking wares not in use.

It is still another object of the present invention to provide an outdoor full function cooking appliance of which the cooking grid and flame tamer are of a circular opening at the central portion so that the cooking ware thereon will be directly heated by the flame of the burner and easily replaceable.

It is a further object of the present invention to provide an outdoor full function cooking appliance which combines all cooking functions in one unit.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

BRIEF DESCRIPTION OF THE DRAWINGS

FIG. 5 is an exploded view of the cart;

FIGS. 6A, 6B and 6C illustrate different kinds of cooking wares arranged on the supporting mount through the central opening of the cooking wire grid;

FIG. 9A is a top plan view of the flame tamer; and

FIG. 9B is a sectional side view of the flame tamer.

DETAILED DESCRIPTION OF THE PREFERRED EMBODIMENT

Figure 1:
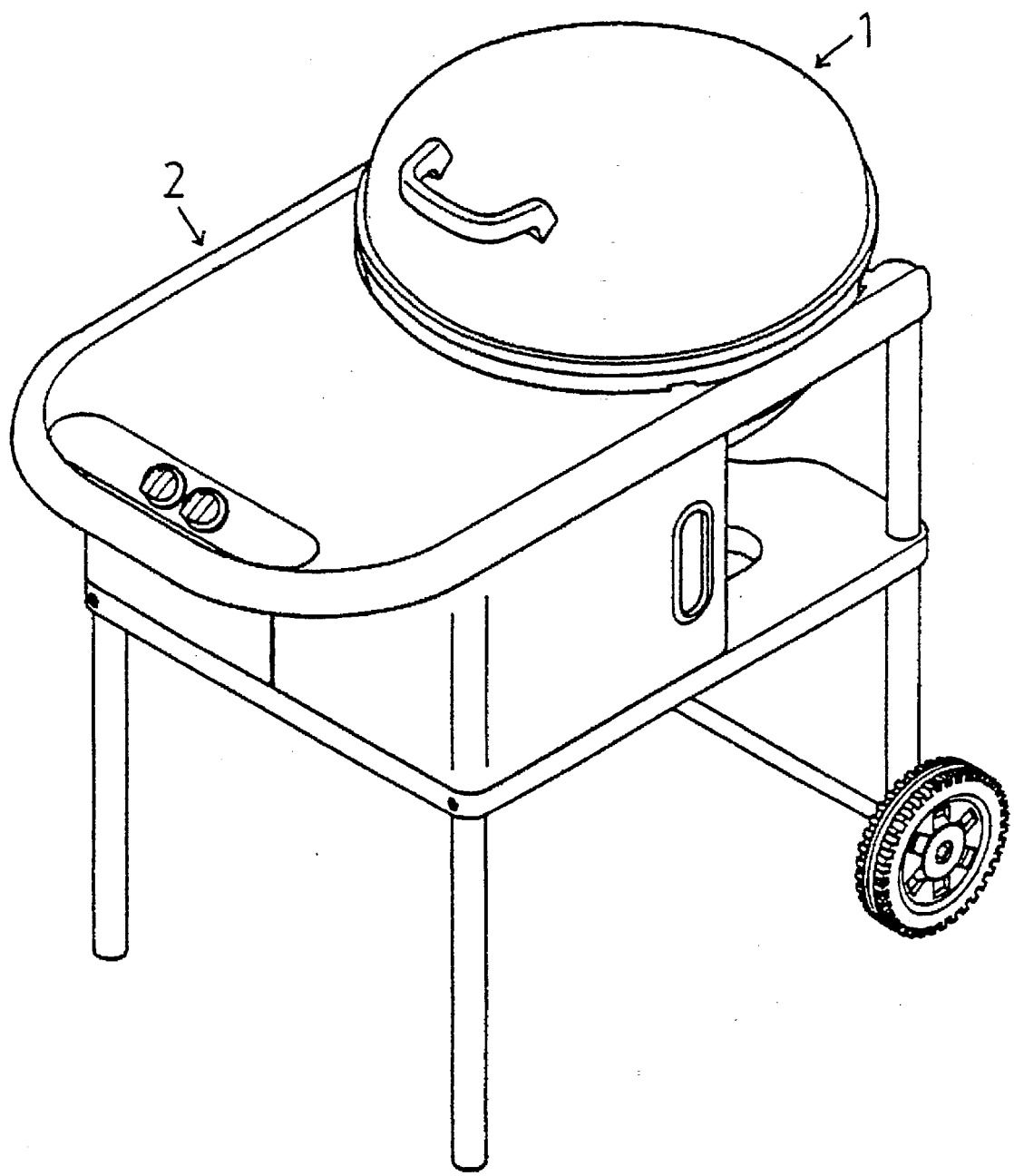
FIG. 1 is a perspective view of an outdoor full function cooking appliance according to the present invention.

For the purpose to promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Figure 2:
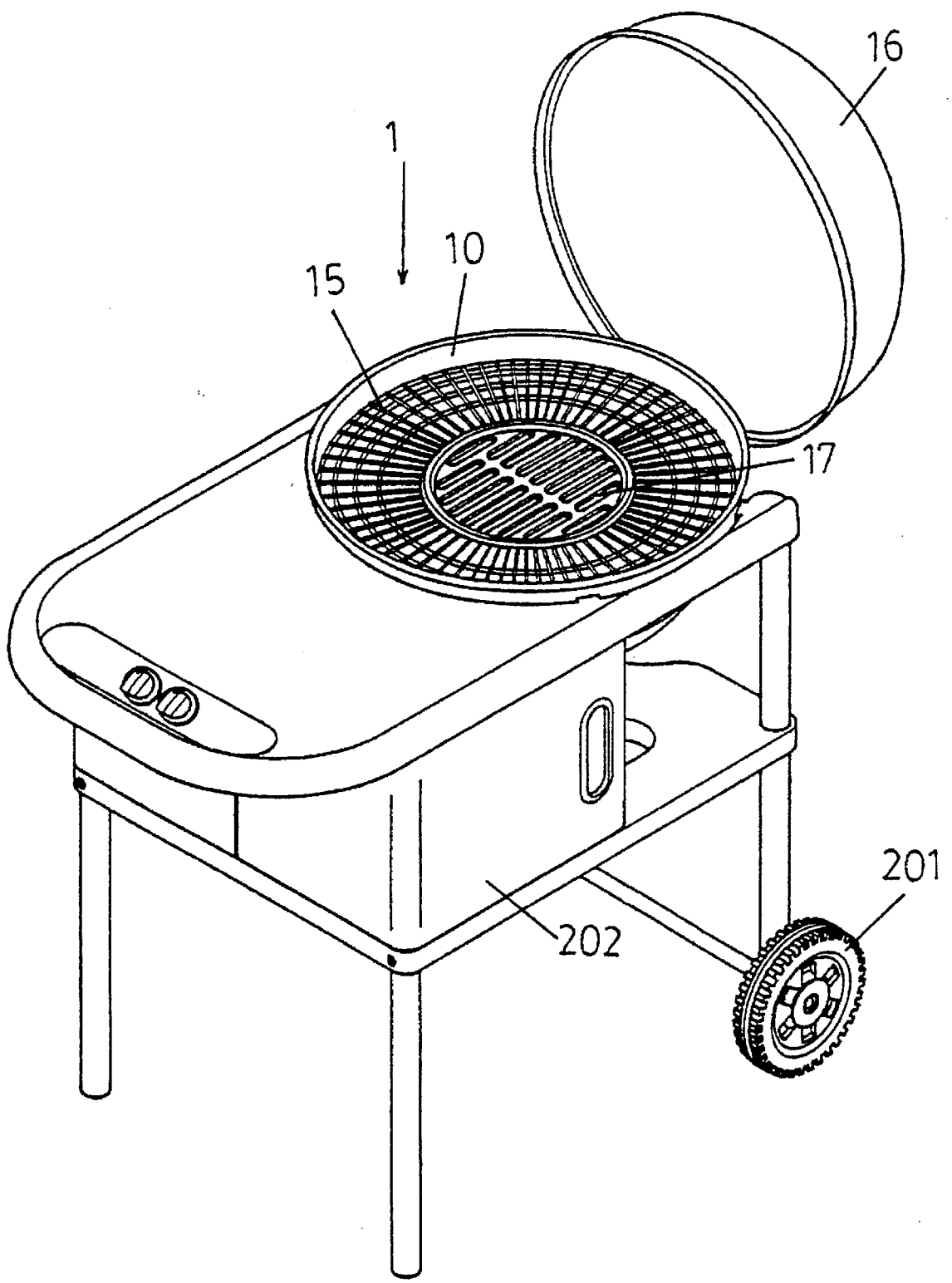
FIG. 2 is a perspective view of the outdoor full function cooking appliance with its lid opened.

With reference to the drawings and in particular to FIGS. 1 and 2 thereof, the outdoor full function cooking appliance according to the present invention comprises a grill 1 and a cart 2.

Figure 3:
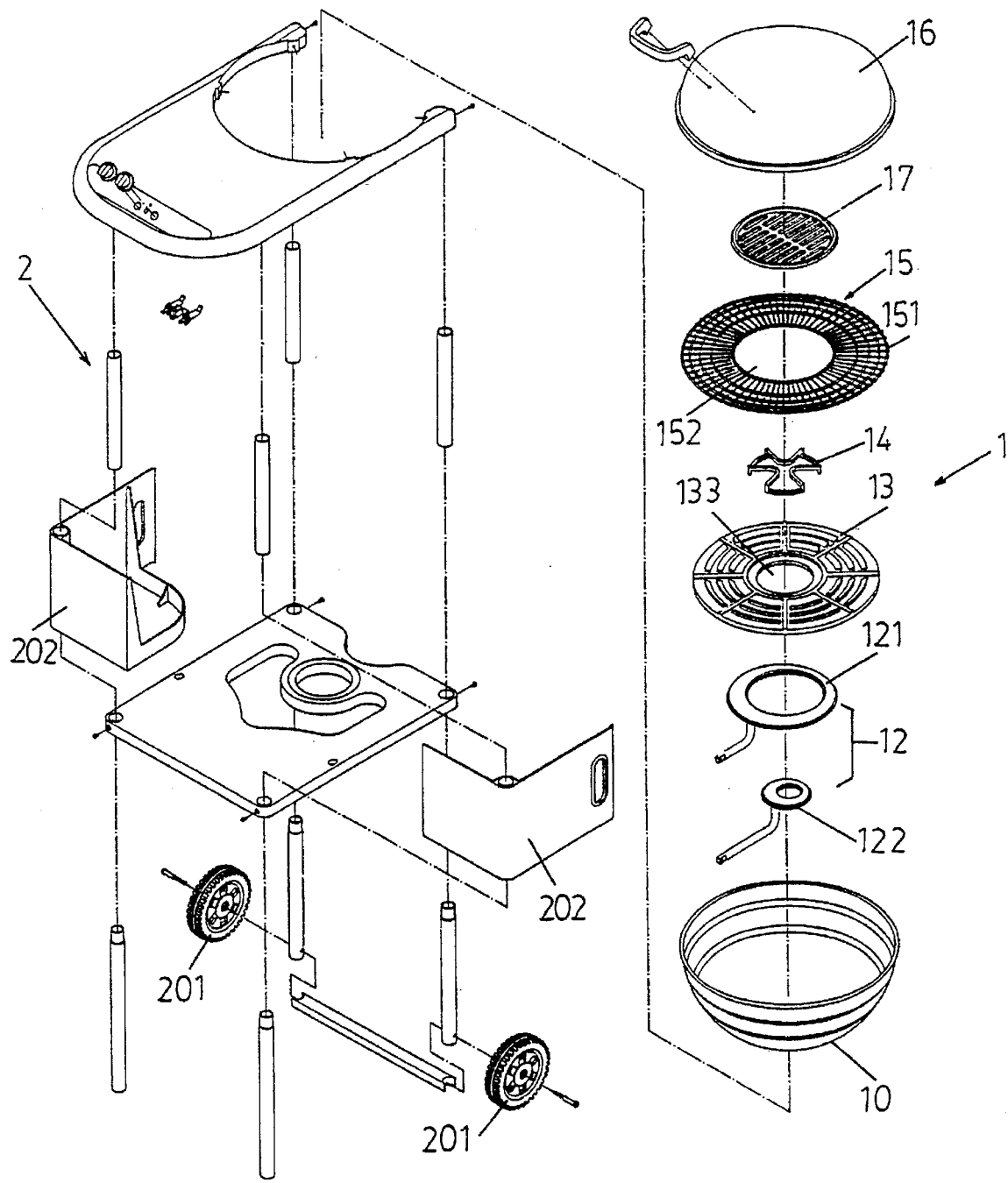
FIG. 3 is an exploded view of the cooking appliance.
Figure 4:
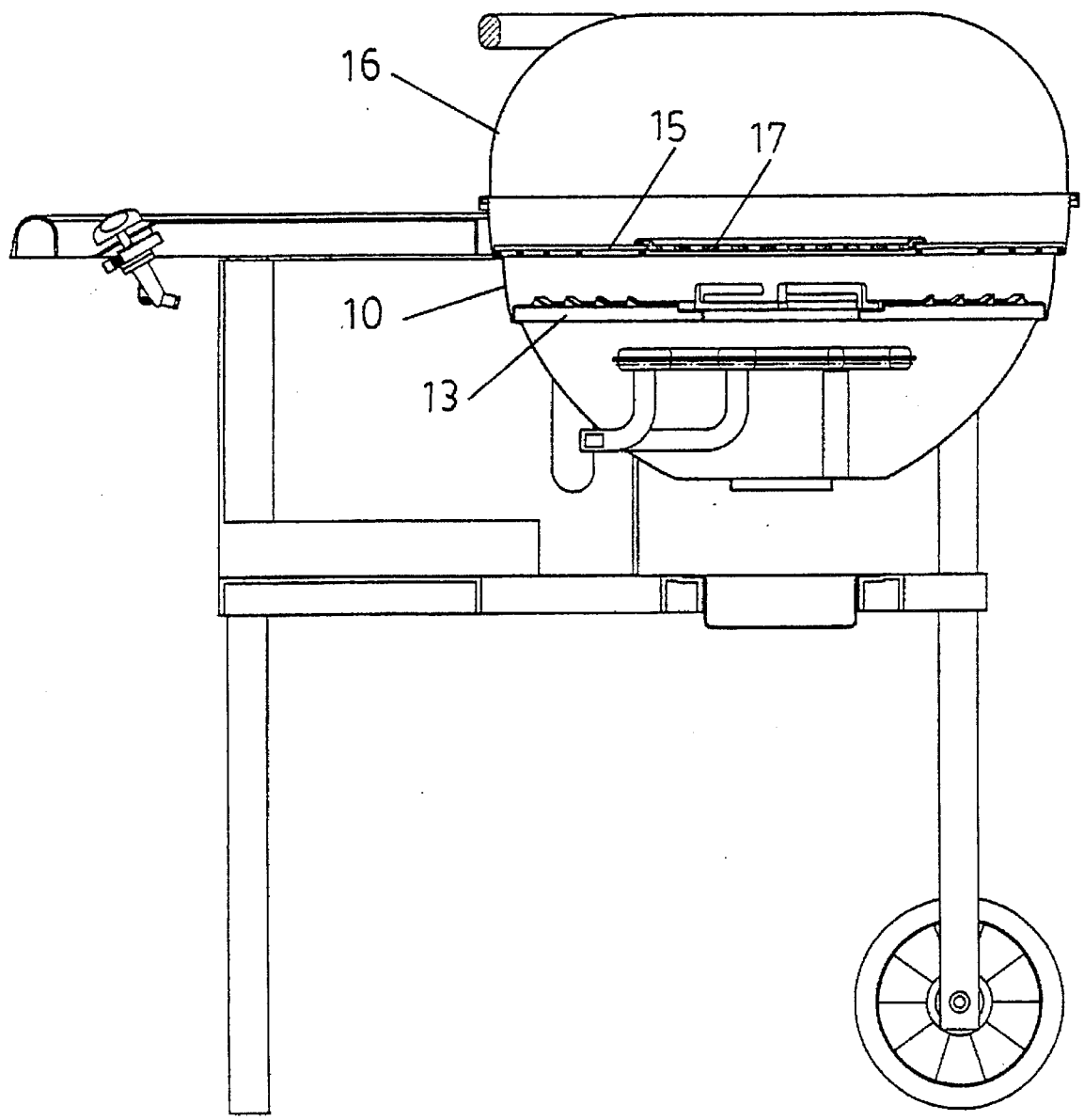
FIG. 4 is a sectional view of the cooking appliance.
Figure 7A:
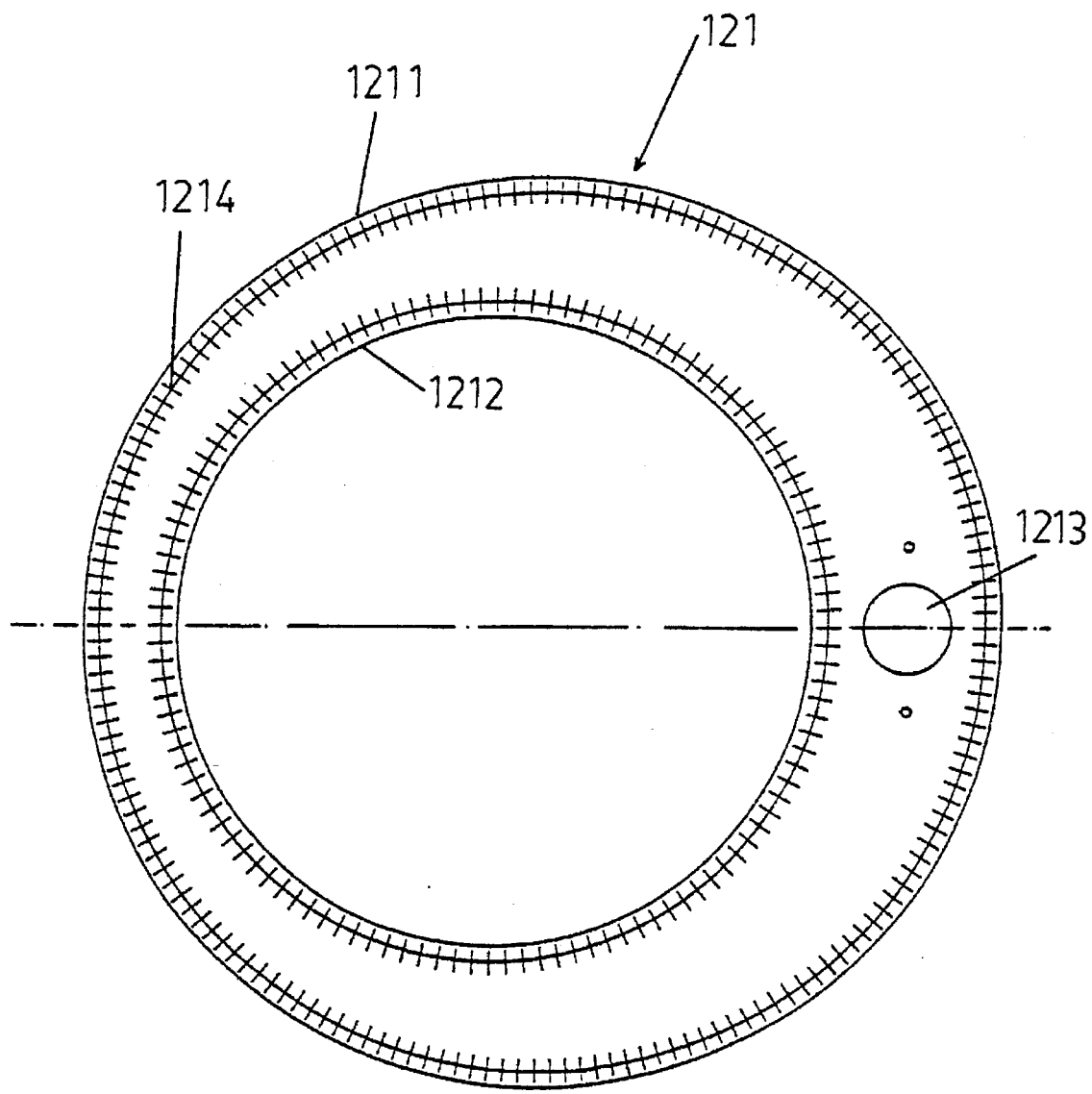
FIG. 7A is a top plan view of the outer ring burner.
Figure 7B:
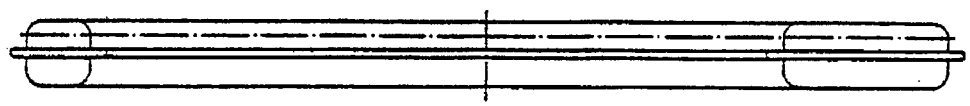
FIG. 7B is a sectional side view of the outer ring burner.
Figure 8B:
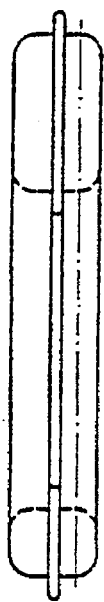
FIG. 8B is a sectional side view of the inner outer ring burner.
Figure 8A:
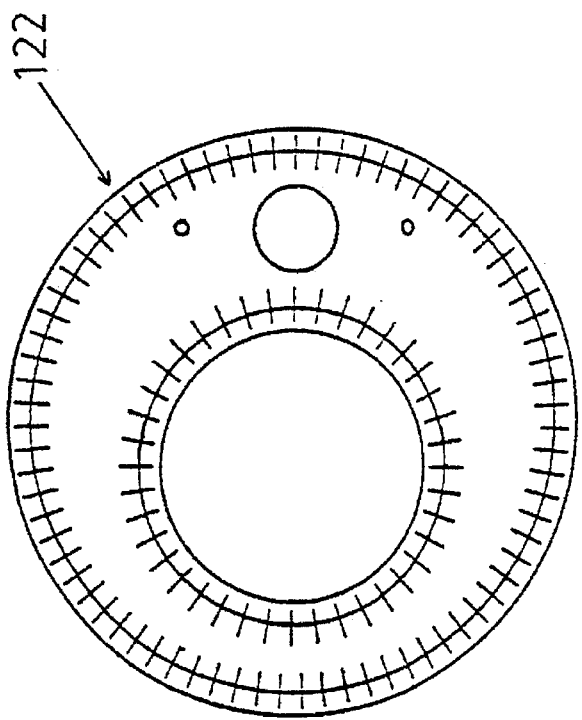
FIG. 8A is a top plan view of the inner ring burner.

As illustrated in FIGS. 3 and 4, the grill 1 includes a hemispherical body 10, an eccentric burner 12, a flame tamer 13, a supporting mount 14, a cooking wire grid 15, a circular disc 17, and a lid 16. The hemispherical body 10 is fixedly mounted on the cart 2. As shown in FIGS. 3, 7A, 7B, 8A and 8B, the eccentric burner 12 includes an outer ring burner 121 and an inner ring burner 122 which is arranged within the outer ring burner 121. The outer ring burner 121 has an outer circular side 1211 and an inner circular side 1212 which do not have the same center. The line joining the centers of the outer circular side 1211 and the inner circular side 1212 divides the outer ring burner 121 into two symmetric halves each having a curved passage with a large cross section at one end and a small cross section at another end. The outer ring burner 121 is provided with an inlet 1213 located at the portion with the largest cross section and having a center lying on a line joining the centers of the outer circular side 1211 and the inner circular side 1212 and a plurality of outlet holes 1214 on the circumference thereof. Hence, the gas pressure within the passage of the outer ring burner 121 will be kept at a constant value thus providing even-heat distribution for the cooking wire grid 15. The inner ring burner 122 has similar structure as the outer ring burner 121. The outer and inner ring burners 121 and 122 are connected with a LPG (low pressure gas) tank (not shown). The connection between the LPG tank and the burners 121 and 122 may be of any conventional design well to those skilled in the art and is not considered a part of the invention.

Referring to FIGS. 3, 9A and 9B, the flame tamer 13 has a central opening 133 and plurality of curved slots 131 which are arcs of circles having the same center of the flame tamer 3. Each of the slots 131 is formed with a hood 132 extending upwardly and slopingly from an inner edge 1311 thereof so as to eliminate flare-ups and providing even heat distribution.

The supporting mount 14 is just fitted in the central opening 133 of the flame tamer 13 and designed for supporting cooking wares such as cooking pan, cooking pot, Chinese wok, or the like.

The cooking wire grid 15 is mounted within the hemispherical body 10 and located above the supporting mount 14. The cooking wire grid 15 is formed with an annular portion 151 and an opening 152 at the central of the annular portion 151 so that a cooking ware such as cooking pan, cooking pot, sauce pan, Chinese wok, or the like can be arranged on the supporting mount 14 through the central opening 152 (see FIGS. 6A, 6B and 6C).

The circular disc 17 is preferably made of cast iron and adapted to fit in the central opening of the cooking grid 15 so that one may fry or grill steak(s) thereon.

The cart 20 is provided with two wheels 201 so as to make it easier to move from one place to another. Further, the cart 20 has two swing-out containers 202 one at a side thereof, which is designed for storing all cooking wares not in use (see FIGS. 3 and 5).

The lid 16 is hingedly connected with the hemispherical body portion 10.

When desired to broil meat or the like on the cooking wire grid 15, it is only necessary to turn on the outer ring burner 121 and the flame tamer 13 will eliminate flare-ups and provide even heat distribution for the cooking wire grid 15. The inner ring burner 122 is used for heating the cooking ware on the supporting mount 14. Further, the outer and inner ring burners 121 and 122 can be turned on for barbecuing and cooking at the same time.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. An outdoor full function cooking appliance comprising:

a cart;

a grill fixedly mounted on said cart and including a hemispherical body and a lid, said lid being adapted to be placed over said hemispherical body;

two ring burners one disposed within the other, mounted within said hemispherical body;

a flame tamer arranged within said hemispherical body and located above said two ring burners;

a supporting mount fitted in a central portion of said flame tamer; and a cooking wire grid mounted within said hemispherical bowl and located above said supporting mount, said cooking wire having a central opening through which a cooking ware my be arranged on said supporting mountnount.

2. The outdoor full function cooking appliance as claimed in claim 1, wherein each of said ring burners is formed with a circular outer side and a circular inner side both formed with a plurality of perforations of passage of gas and said circular inner side does not have same center as said circular outer side.

3. The outdoor full function cooking appliance as claimed in claim 1, wherein said flame tamer has a first circular opening at a central portion and a plurality of curved slots having same center as said flame tamer, each of said curved slots being formed with a hood extending upwardly and slopingly from an inner edge thereof.

4. The outdoor full function cooking appliance as claimed in claim 1, wherein said cooking grid has a second circular opening at a central portion which is aligned with the first circular opening of said flame tamer.

5. The outdoor full function cooking appliance as claimed in claim 1, wherein said lid is hingedly connected with said hemispherical bowl.

6. The outdoor full function cooking appliance as claimed in claim 1, further comprising a circular disc adapted to fit in the central opening of said cooking grid.

* * * * *